(12) United States Patent
Nakai (10) Patent No.: US 6,587,272 B2
(45) Date of Patent: Jul. 1, 2003

(54) DIFFRACTIVE OPTICAL ELEMENT

(75) Inventor: Takehiko Nakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/327,474

(22) Filed: Jun. 8, 1999

(65) Prior Publication Data

US 2002/0012170 A1 Jan. 31, 2002

(30) Foreign Application Priority Data

Jun. 16, 1998 (JP) ............................................. 10-185680
Apr. 5, 1999 (JP) ............................................. 11-097403

(51) Int. Cl.[7] .......................... G02B 5/18; G02B 27/44
(52) U.S. Cl. ........................ 359/569; 359/576; 359/575; 359/571; 359/566
(58) Field of Search .................................. 359/569, 571, 359/573, 574, 575, 576, 566, 565

(56) References Cited

U.S. PATENT DOCUMENTS

| | | | |
|---|---|---|---|
| 4,426,130 A | | 1/1984 | Knop |
| 4,679,901 A | * | 7/1987 | Dammann et al. ........... 359/575 |
| 5,029,154 A | * | 7/1991 | Sumi et al. .................. 359/576 |
| 5,044,706 A | | 9/1991 | Chen ........................... 359/357 |
| 5,048,925 A | | 9/1991 | Gerritsen et al. |
| 5,175,647 A | * | 12/1992 | Gupta et al. ................. 359/566 |
| 5,446,588 A | | 8/1995 | Missig et al. |
| 5,483,377 A | * | 1/1996 | Kaneda et al. ............... 359/566 |
| 5,737,113 A | | 4/1998 | Kuramochi et al. |
| 5,825,523 A | * | 10/1998 | Amitai ........................ 359/575 |
| 5,847,877 A | | 12/1998 | Imamura et al. ............. 359/566 |
| 6,157,488 A | | 12/2000 | Ishii ............................ 359/569 |

FOREIGN PATENT DOCUMENTS

| | | |
|---|---|---|
| DE | 195 33 591 | 3/1996 |
| EP | 0 895 100 | 2/1999 |
| JP | 3-152052 | 6/1991 |
| JP | 04-213421 | 8/1992 |
| JP | 06-324262 | 11/1994 |
| JP | 09-127322 | 5/1997 |
| JP | 10-133149 | 5/1998 |

OTHER PUBLICATIONS

"The Design of Achromatized Hybrid Diffractive Lens Systems", C. Londono, et al., Proceedings of the International Lens Design Conference, vol. 1354, pp 30–37, Jun. 11–14, 1990.

George N. Lawrence, "International Lens Design Conference", Proceedings SPIE—The International Society For Optical Engineering, vol. 1354, pp. 24–37, (1990).

* cited by examiner

Primary Examiner—Audrey Chang
(74) Attorney, Agent, or Firm—Fitzpatrick, Cella, Harper & Scinto (57) ABSTRACT

A diffractive optical element is composed of a plurality of diffraction gratings which differ in dispersion from each other and are laminated while being spaced to enhance diffraction efficiency for a particular order (design order) throughout an entire usable wavelength region, wherein edges of at least part of corresponding grating portions of the plurality of diffraction gratings are shifted from each other in a direction of arrangement of grating portions of each diffraction grating.

32 Claims, 7 Drawing Sheets

FIG. 17

DIFFRACTIVE OPTICAL ELEMENT

BACKGROUND OF THE INVENTION

1. Field of the Invention

The present invention relates to diffractive optical elements and, more particularly, to a diffractive optical element having such a grating structure that concentrates a plurality of wavelengths or a predetermined band of wavelengths of light on a particular order (or design order). Still more particularly, it relates to optical systems using such diffractive optical elements.

2. Description of Related Art

Heretofore, the optical systems have been corrected for chromatic aberrations by combining two glass materials (lenses) of different dispersion.

Unlike this conventional method of reducing the chromatic aberrations, a novel method of further reducing the chromatic aberrations by using a diffractive optical element in which a diffraction grating having a diffracting function is provided on a lens surface or in part of the optical system is disclosed in, for example, SPIE Vol. 1354 "International Lens Design Conference " (1990), Japanese Laid-Open Patent Applications No. Hei 4-213421 and No. Hei 6-324262 and U.S. Pat. No. 5,044,706.

The above novel method has been developed by utilizing a physical phenomenon that the refractive surface and the diffractive surface in an optical system produce chromatic aberrations for the rays of light of a certain reference wavelength in respective opposite directions.

Moreover, such a diffractive optical element can be made to behave like an aspherical lens by changing the periodic structure thereof, giving a great advantage of reducing many aberrations.

Here, the actions of light passing through the refractive surface and the diffractive surface are compared. For the refractive surface, one beam after being refracted even remains one in number. For the diffractive surface, one beam, when diffracted, breaks up into a number of beams in diffraction orders.

Thus, if the diffractive optical element is used as a lens system, there is need to decide the grating structure so that a light beam of the usable wavelength region concentrates in a particular order (hereinafter also referred to as "design" order). In a situation when light concentrates on the particular order, the intensities of light beams of the other diffraction orders become low. If the intensity is "0", the corresponding diffracted light can be regarded as not existing.

For that purpose, the diffraction efficiency for light beams in the design order must be high enough. In another situation when the diffracted rays in the other orders than the design order are present, they focus themselves at different places than that at which the rays in the design order do, becoming light to produce flare.

In an optical system employing the diffractive optical element, it is, therefore, of great importance to fully consider even the spectral distribution of diffraction efficiencies in the design order and the behavior of the rays in the other orders.

Figure 12:
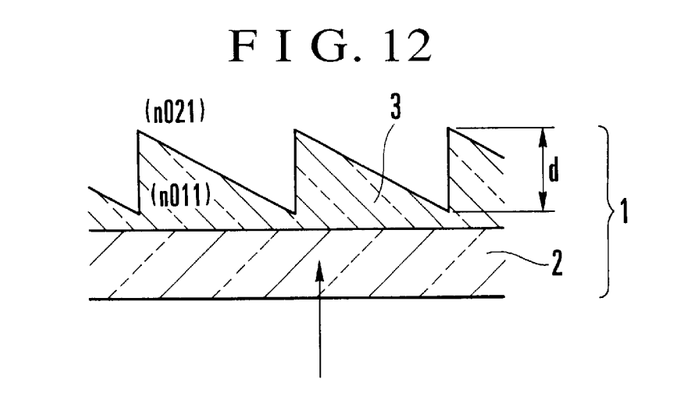
FIG. 12 is a fragmentary sectional view of the main part of a conventional diffractive optical element.
Figure 13:
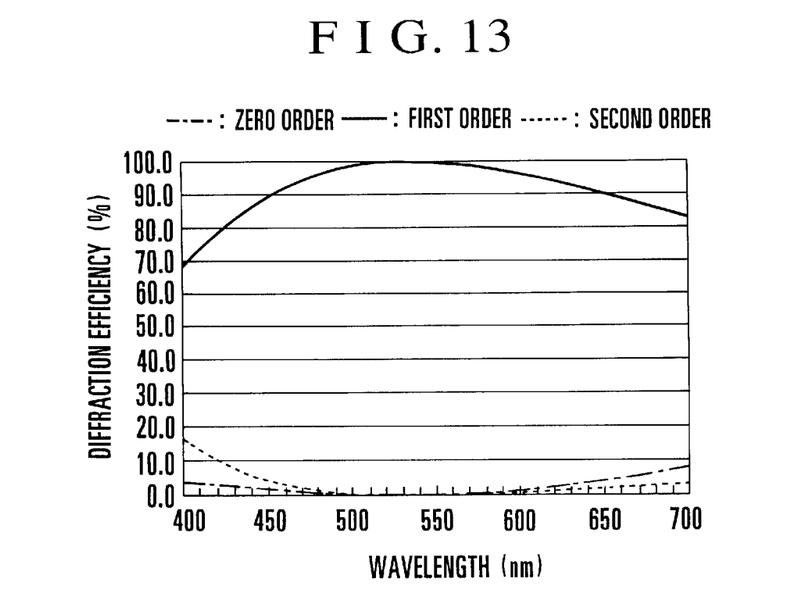
FIG. 13 is a graph for explaining the diffraction efficiency for diffraction orders in the diffractive optical element shown in FIG. 12.

FIG. 12 shows a mono-layer diffractive optical element 1 in which a diffraction grating 3 is formed on a substrate 2, constituting part of an optical system. FIG. 13 shows characteristic curves of the diffractive optical element 1 for selected orders of the diffraction efficiency against wavelengths.

The values of the diffraction efficiency are in percentage of the amount of diffracted light of each wavelength to the total amount of transmitted light. The reflected light from the grating boundary or the like is not taken into account in the evaluation.

As the optical material of the diffractive optical element 1, use is made of a plastic material named "PMMA" (nd=1.4917, vd=57.4). The grating thickness "d" is determined to be 1.07 μm. In FIG. 13, the abscissa axis represents wavelength and the ordinate axis represents diffraction efficiency.

The diffractive optical element 1 is so designed that the diffraction efficiency is highest at a wavelength of 530 nm in the first order (solid line in FIG. 13). That is, the design order is the first order.

Further, the diffraction efficiencies in the next orders to the first one (or (1±1)st orders, namely, the zero order and the second order) are also depicted for comparison. As shown in FIG. 13, it is in the design order that the diffraction efficiency takes a highest value at a certain wavelength (hereinafter referred to as "design" wavelength) and falls off gradually at other wavelengths.

In the arrangement described above, the lowered portion of the diffraction efficiency in the design order becomes the diffracted rays in the other orders, that is, flare. Also, if a plurality of diffraction gratings are used, the lowering of the diffraction efficiency at the other wavelengths than the design wavelength leads to reduction of the transmittance.

Figure 14:
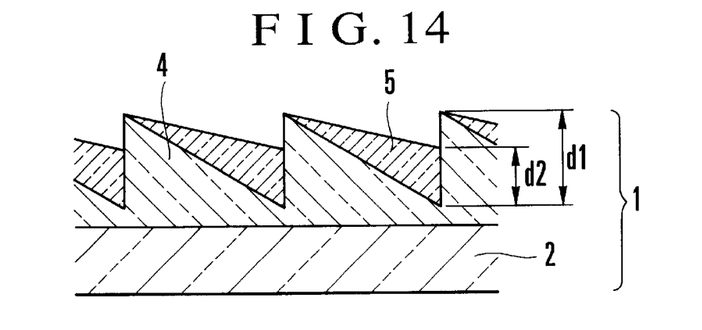
FIG. 14 is a fragmentary sectional view of the main part of another conventional diffractive optical element.
Figure 15:
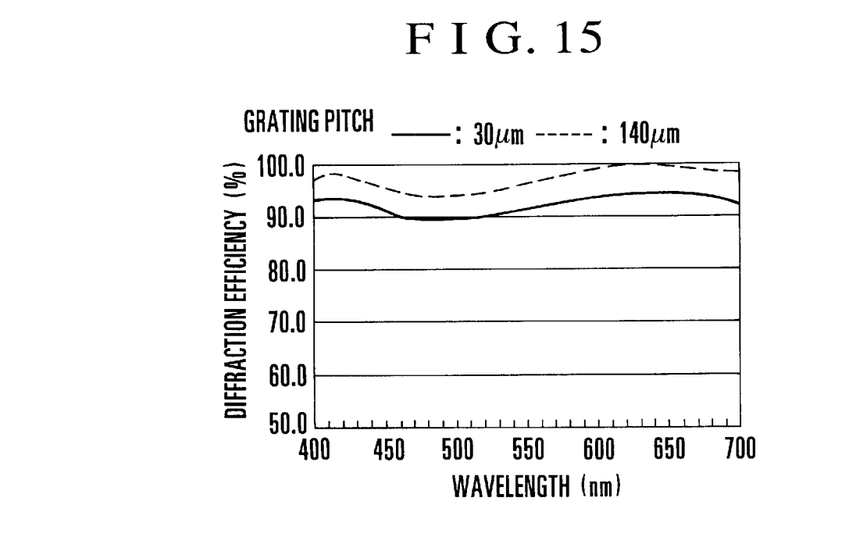
FIG. 15 is a graph for explaining the diffraction efficiency for the first order in the diffractive optical element shown in FIG. 14.

An arrangement that can diminish the lowering of the diffraction efficiency has been proposed in Japanese Laid-Open patent Application No. Hei 10-133149. The diffractive optical element suggested in this proposal is shown in FIG. 14, where two diffraction gratings 4 and 5 are applied on a substrate 2 in superimposed relation to form a diffraction grating of laminated structure in cross-section. The refractive indices and dispersion characteristics of the materials of the two layers and the grating thickness of each layer are made optimal to realize a high diffraction efficiency over the whole visible spectrum. FIG. 15 is a graph for explaining the spectral characteristics of the diffractive optical element 1 shown in FIG. 14.

Figure 16:
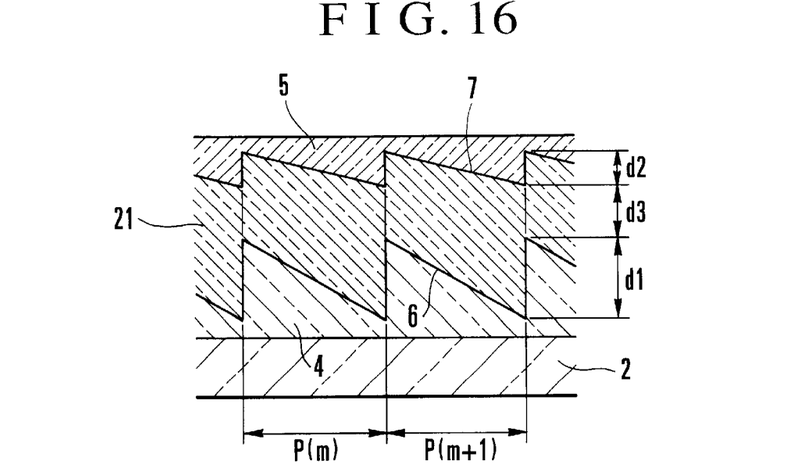
FIG. 16 is a fragmentary sectional view of the main part of a further conventional laminated-type diffractive optical element.
Figure 17:
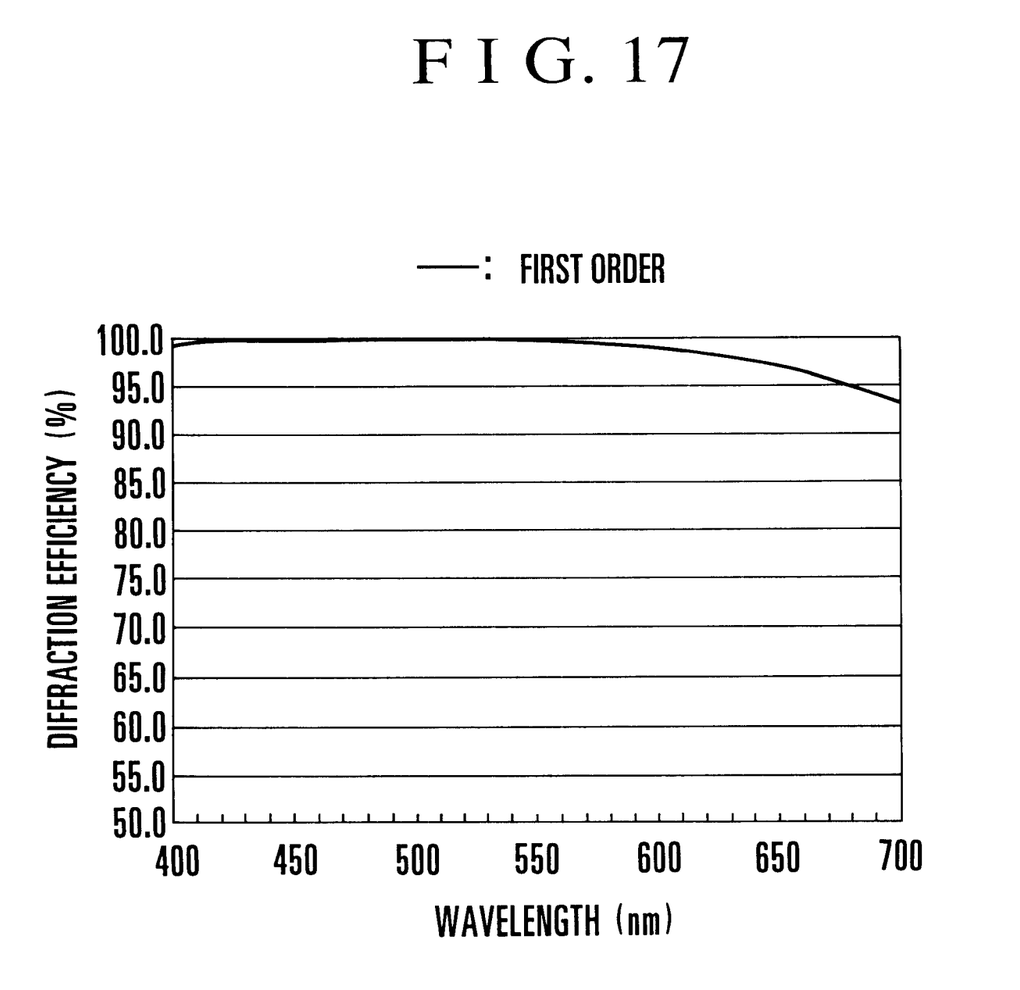
FIG. 17 is a graph for explaining the diffraction efficiency for the first order in the diffractive optical element shown in FIG. 16.

Another arrangement that can diminish the lowering of the diffraction efficiency is proposed in Japanese Laid-Open Patent Application No. Hei 9-127322. As shown in FIG. 16, three diffraction gratings 4, 21 and 5 are made up by optimally selecting three different kinds of material and two different grating thicknesses d1 and d2, and are laid adjacent to each other on the substrate 2 with their grooves distributed in equal pitches, thus realizing a high diffraction efficiency throughout the entire range of visible spectrum, as shown in FIG. 17.

In the prior known diffractive optical elements described above, the detailed specification is available about the materials and grating thicknesses with which to form the relief pattern (hereinafter also referred to as the "diffraction grating surface"). However, concerning what values to use in the grating pitch and the total sum of the grating thicknesses including the interval between the two gratings (diffraction gratings), only the condition of the Q value satisfying the thin type of diffraction grating is explained.

However, as a plurality of diffraction gratings are laminated to reduce the lowering of the diffraction efficiency over the entire range of visible spectrum, a number of design parameters have to be taken into account. Among all the combinations of the factors, the ones disclosed in the above-cited documents are not always the best in some cases. Although will be more fully described later, for example, the grating pitch is too much small, and the interval between the two diffraction gratings (the thickness d3 in FIG. 16) is too much large.

Further, in the prior known diffractive optical elements described above, with regard to the grating pitch in each relief pattern, it is only suggested that all the pitches are made equal to one another and the corresponding grooves are arranged in confronting relation, and what are concerned with these are only illustrated. In other words, a premise is made such that the grating edges of the two relief patterns are aligned to each other.

BRIEF SUMMARY OF THE INVENTION

The present invention is applied to the diffractive optical element having two or more diffraction gratings of different kinds appropriately stratified on a substrate, and has an aim to obtain a high diffraction efficiency even when the grating pitch is small, or when the grating thickness is large, thus making it possible to effectively suppress flare or the like.

According to a first aspect of the present invention, there is provided a diffractive optical element, comprising a plurality of diffraction gratings which differ in dispersion from each other and are laminated while being spaced to enhance diffraction efficiency for a particular order (design order) throughout an entire usable wavelength region, wherein edges of at least part of corresponding grating portions of the plurality of diffraction gratings are shifted from each other in a direction of arrangement of grating portions of each diffraction grating.

According to a second aspect of the present invention, there is provided a diffractive optical element, comprising a plurality of diffraction gratings which differ in dispersion from each other and are laminated while being spaced to enhance diffraction efficiency for a particular order (design order) throughout an entire usable wavelength region, wherein grating pitches of at least part of corresponding grating portions of the plurality of diffraction gratings are different from each other.

According to a third aspect of the present invention, as applied to the diffractive optical element in the first or second aspect, a grating pitch of each of the plurality of diffraction gratings is gradually varied, and shifting of edges between corresponding grating portions of the plurality of diffraction gratings becomes larger accordingly as the grating pitch of each grating portion becomes smaller.

According to a fourth aspect of the present invention, as applied to the diffractive optical element in the first or second aspect, where n1L and n2L are refractive indices for an arbitrary wavelength $\lambda$ on a light-entrance side and a light-exit side, respectively, of a material of the L-th diffraction grating, when counted from a substrate, of the plurality of diffraction gratings, $\theta L$ is an angle an incident ray makes with a normal line of a grating, P is a grating pitch, dL is a grating thickness of the L-th diffraction grating, and DL is a distance between the L-th diffraction grating and the (L+1)st diffraction grating, a positional shift $\Delta \times L$ between edges of corresponding grating portions of the (L+1)st diffraction grating and the L-th diffraction grating satisfies the following condition:

$$0 < \Delta \times L \leq 2((dL/2)+DL)*\tan \alpha_{L+1}$$

$$\alpha_{L+1}=\sin^{-1}((n1L*\sin\theta L-(n1L-n2L)d1/P)/n2L).$$

According to a fifth aspect of the present invention, as applied to the diffractive optical element in the first aspect, the diffractive optical element has a plurality of areas in a light-transmitting plane, and edges of corresponding grating portions of laminated diffraction gratings in part of the plurality of areas are shifted from each other.

According to a sixth aspect of the present invention, as applied to the diffractive optical element in the second aspect, the diffractive optical element has a plurality of areas in a light-transmitting plane, and grating pitches of corresponding grating portions of laminated diffraction gratings in part of the plurality of areas are different from each other.

According to a seventh aspect of the present invention, as applied to the diffractive optical element in the first aspect, shifting of edges between corresponding grating portions of the plurality of diffraction gratings is realized by changing the width of a grating pitch at particular locations of the grating portions.

According to an eighth aspect of the present invention, as applied to the diffractive optical element in the second aspect, a difference between grating pitches of corresponding grating portions of the plurality of diffraction gratings is realized by changing the width of a grating pitch at particular locations of the grating portions.

According to a ninth aspect of the present invention, as applied to the diffractive optical element in the first or second aspect, the plurality of diffraction gratings include at least one diffraction grating a direction of increase of a grating depth of which is different from that of the other diffraction gratings.

According to a tenth aspect of the present invention, as applied to the diffractive optical element in the first or second aspect, the usable wavelength region is a visible spectrum.

According to an eleventh aspect of the present invention, as applied to the diffractive optical element in the first or second aspect, the first diffraction grating, when counted from a substrate, of the laminated plurality of diffraction gratings is made from the same material as that of the substrate.

According to a twelfth aspect of the present invention, as applied to the diffractive optical element in the first or second aspect, the plurality of diffraction gratings consist of two diffraction gratings having respective grating portions edges or pitches of which are shifted or different from each other, the two diffraction gratings confronting each other across an air layer.

According to a thirteenth aspect of the present invention, there is provided a diffractive optical element, comprising a plurality of diffraction gratings which differ in dispersion from each other and are laminated while being spaced, wherein, with respect to at least two wavelengths, a maximum optical path length difference is made equal to integer times each of the wavelengths, and wherein edges of at least part of corresponding grating portions of the plurality of diffraction gratings are shifted from each other in a direction of arrangement of grating portions of each diffraction grating.

According to a fourteenth aspect of the present invention, there is provided a diffractive optical element, comprising a plurality of diffraction gratings which differ in dispersion from each other and are laminated while being spaced, wherein, with respect to at least two wavelengths, a maximum optical path length difference is made equal to integer times each of the wavelengths, and wherein grating pitches of at least part of corresponding grating portions of the plurality of diffraction gratings are different from each other.

According to a fifteenth aspect of the present invention, as applied to the diffractive optical element in the thirteenth or fourteenth aspect, a grating pitch of each of the plurality of diffraction gratings is gradually varied, and shifting of edges between corresponding grating portions of the plurality of diffraction gratings becomes larger accordingly as the grating pitch of each grating portion becomes smaller.

According to a sixteenth aspect of the present invention, as applied to the diffractive optical element in the thirteenth or fourteenth aspect, where n1L and n2L are refractive indices for an arbitrary wavelength λ on a light-entrance side and a light-exit side, respectively, of a material of the L-th diffraction grating, when counted from a substrate, of the plurality of diffraction gratings, θL is an angle an incident ray makes with a normal line of a grating, P is a grating pitch, dL is a grating thickness of the L-th diffraction grating, and DL is a distance between the L-th diffraction grating and the (L+1)st diffraction grating, a positional shift ΔxL between edges of corresponding grating portions of the (L+1)st diffraction grating and the L-th diffraction grating satisfies the following condition:

$$0 < \Delta xL \leq 2((dL/2)+DL)*\tan \alpha_{L+1}$$

$$\alpha_{L+1} = \sin^{-1}((n1L*\sin\theta L - (n1L - n2L)d1/P)/n2L).$$

According to a seventeenth aspect of the present invention, as applied to the diffractive optical element in the thirteenth aspect, the diffractive optical element has a plurality of areas in a light-transmitting plane, and edges of corresponding grating portions of laminated diffraction gratings in part of the plurality of areas are shifted from each other.

According to an eighteenth aspect of the present invention, as applied to the diffractive optical element in the fourteenth aspect, the diffractive optical element has a plurality of areas in a light-transmitting plane, and grating pitches of corresponding grating portions of laminated diffraction gratings in part of the plurality of areas are different from each other.

According to a nineteenth aspect of the present invention, as applied to the diffractive optical element in the thirteenth aspect, shifting of edges between corresponding grating portions of the plurality of diffraction gratings is realized by changing the width of a grating pitch at particular locations of the grating portions.

According to a twentieth aspect of the present invention, as applied to the diffractive optical element in the fourteenth aspect, a difference between grating pitches of corresponding grating portions of the plurality of diffraction gratings is realized by changing the width of a grating pitch at particular locations of the grating portions.

According to a twenty-first aspect of the present invention, as applied to the diffractive optical element in the thirteenth or fourteenth aspect, the plurality of diffraction gratings include at least one diffraction grating a direction of a grating portion of which is different from that of the other diffraction gratings.

According to a twenty-second aspect of the present invention, as applied to the diffractive optical element in the thirteenth or fourteenth aspect, the two wavelengths are included in a visible spectrum.

According to a twenty-third aspect of the present invention, as applied to the diffractive optical element in the thirteenth or fourteenth aspect, the first diffraction grating, when counted from a substrate, of the laminated plurality of diffraction gratings is made from the same material as that of the substrate.

According to a twenty-fourth aspect of the present invention, as applied to the diffractive optical element in the thirteenth or fourteenth aspect, the plurality of diffraction gratings consist of two diffraction gratings having respective grating portions edges or pitches of which are shifted or different from each other, the two diffraction gratings confronting each other across an air layer.

According to a twenty-fifth aspect of the present invention, as applied to the diffractive optical element in one of the first to twenty-fourth aspects, the diffraction efficiency in a particular order is made not less than 95% in a wavelength range of 450 nm to 650 nm.

Further, there is provided an image forming optical system or an observing optical system using the diffractive optical element in one of the first to twenty-fifth aspects.

These and further aspects and features of the present invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
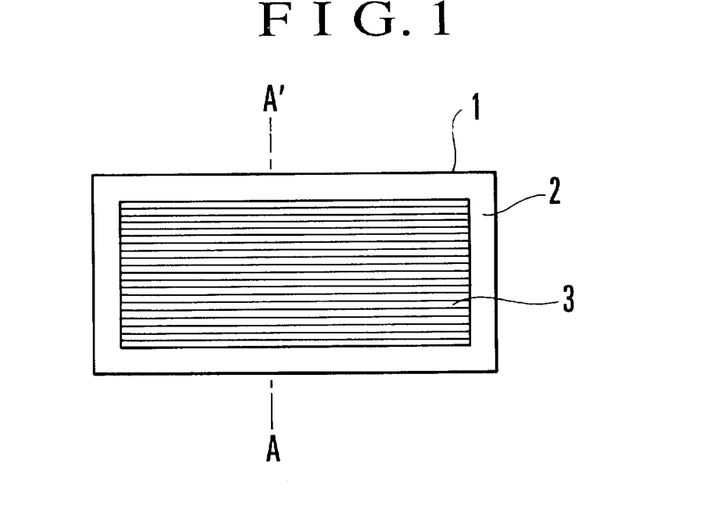
FIG. 1 is a front elevation view of a diffractive optical element according to a first embodiment of the invention.

FIG. 1 is a front elevational view showing a diffractive optical element according to a first embodiment of the invention. Referring to FIG. 1, the diffractive optical element 1 has such a construction that a multilayer diffraction grating 3 composed of a plurality of diffraction gratings is formed on a substrate 2.

Figure 2:
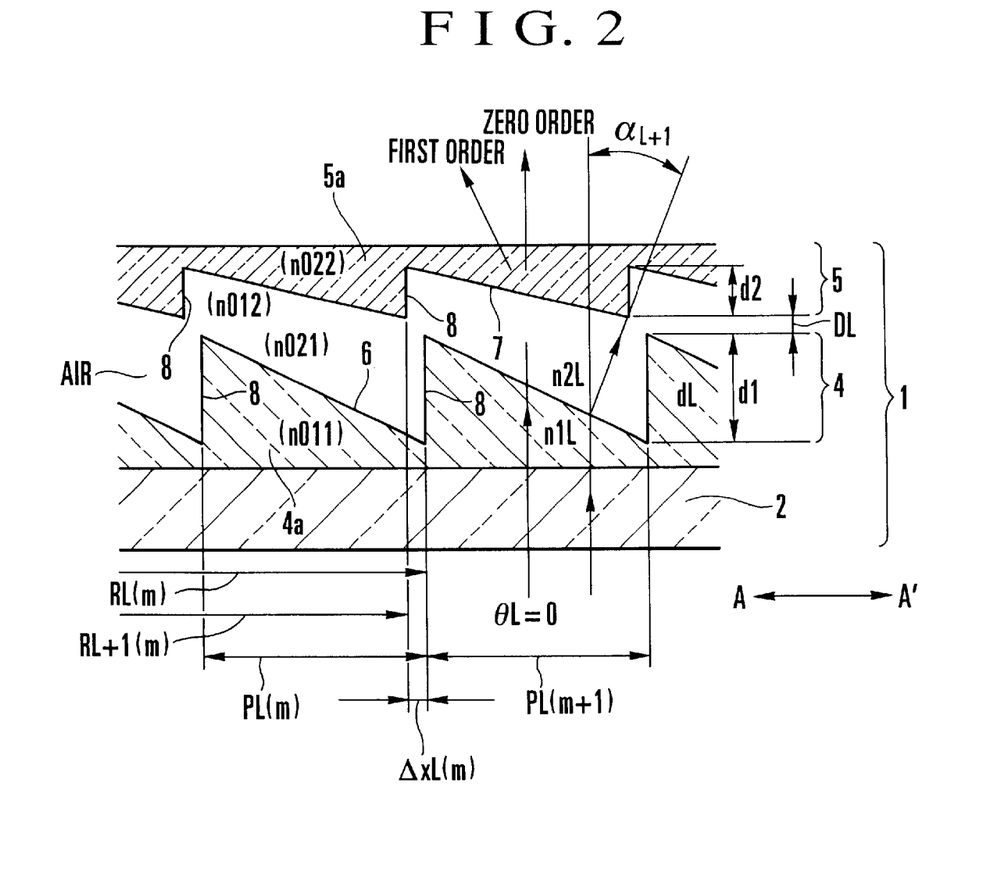
FIG. 2 is a fragmentary sectional view, in enlarged scale, of the diffractive optical element according to the first embodiment.

FIG. 2 is a fragmentary sectional view of the diffractive optical element 1 shown in FIG. 1, as taken along line A–A' in FIG. 1. Incidentally, the illustration of FIG. 2 is considerably deformed in the direction of depth of the grating (diffraction grating).

The diffraction grating 3 according to the first embodiment is shaped such that, on the substrate 2, a diffraction grating 4 as a first layer and a diffraction grating 5 as a second layer which differ in dispersion from each other are laminated with an air layer AIR put therebetween.

A first diffraction grating surface 6 is formed by the boundary between a grating portion 4a of the first layer and the air layer AIR, and a second diffraction grating surface 7 is formed by the boundary between the air layer AIR and a grating portion 5a of the second layer. In the laminated diffraction gratings 4 and 5, positions of respective grating edges 8 of the grating portions 4a and 5a, which constitute respective grating pitches of the diffraction gratings 4 and 5, are relatively shifted from each other in the direction of the grating pitch (in the direction of arrow A–A'). Then, all the layers thus laminated optically functions as one diffractive optical element.

Further, in the laminated diffraction gratings 4 and 5 according to the first embodiment, a grating thickness d1 of the first diffraction grating 4 in one period thereof decreases monotonously as viewed from the left to the right in FIG. 2, and a grating thickness d2 of the second diffraction grating 5 in one period thereof increases monotonously as viewed from the left to the right in FIG. 2.

Further, the air layer AIR is put between the diffraction grating surfaces 6 and 7. By this arrangement, the grooves of the diffraction grating surfaces 6 and 7 can be made shallower, so that the diffractive optical element becomes amendable to easy production techniques.

It will be appreciated that the diffractive optical element according to the first embodiment has such a structure of construction that at least two diffraction gratings made of at least two materials of different dispersion are superimposed one upon another in contacted (nearly contacted) relation and such a grating form that grating edges of corresponding grating portions of the diffraction gratings are relatively shifted from each other in the direction of the grating pitch.

With the grating edges of the corresponding grating portions relatively shifted from each other, there can be obtained a higher diffraction efficiency than that when no shifting is present in the structure of construction of FIG. 1. In application to an optical system, too, flare or like can be advantageously suppressed to a minimum.

Next, the diffractive optical element in the invention is discussed from the point of view of the diffraction efficiency. In an ordinary, one-layer transmission-type diffractive optical element 1 as shown in FIG. 12 in sectional view, the diffraction efficiency becomes highest at the design wavelength $\lambda 0$ under a condition that, as a light beam is perpendicularly incident on the diffraction grating 3, the difference between the optical path lengths to the peak and valley of the diffraction grating 3 (or the maximum optical path length difference) is equal to integer times the design wavelength. Thus, the following relation is obtained:

$$(n011-n021)d=m\lambda 0 \qquad (1).$$

Here, n011 is the refractive index for the wavelength $\lambda 0$ of a material on the light-entrance side and n021 is the refractive index for the wavelength $\lambda 0$ of a material on the light-exit side. (Both n011 and n021 vary with the wavelength $\lambda$, as is well known in the art.) In the ordinary diffractive optical element, the light-exit side faces an air layer, so that n021=1.0. Further, d represents the grating thickness, and m stands for the order number of diffraction. Even in a diffractive optical element having two or more diffraction grating layers, the fundamental laws are applied in a similar fashion. In order to make all the layers function as one diffraction grating, the difference between the optical path lengths to the peak and valley of the grating portion of each diffraction grating which is formed in the boundary between any adjoining two of the layers is first found. For all the boundaries, the differences are summed up. So, determination is made such that the total sum falls in becoming equal to integer times the design wavelength. In the case of the first embodiment shown in FIG. 2, therefore, the following condition is obtained:

$$(n011-n021)d1 \pm (n022-n012)d2=m\lambda 0 \qquad (2)$$

where n011 is the refractive index for the wavelength $\lambda 0$ of a material on the light-entrance side of the first diffraction grating 4, n021 is the refractive index for the wavelength $\lambda 0$ of a material (AIR) on the light-exit side of the first diffractive grating 4, n012 is the refractive index for the wavelength $\lambda 0$ of a material (AIR) on the light-entrance side of the second diffraction grating 5, n022 is the refractive index for the wavelength $\lambda 0$ of a material on the light-exit side of the second diffraction grating 5, (where n011, n021, n022 and n012 also vary with wavelength, as is well known in the art) and d1 and d2 are respectively the grating thickness of the first diffraction grating 4 and the second diffraction grating 5.

Here, since diffraction occurs on either side of the zero order, what diffracts to the left as viewed in FIG. 2 is assumed to be positive in the diffraction orders. Then, for the symbol of "±" in the equation (2), it reads "+" in the case of the first diffraction grating 4, in which the grating thickness decreases as viewed from the left to the right in FIG. 2, or it reads "−" in the case of the second diffraction grating 5, in which the grating thickness increases as viewed from the left to the right in FIG. 2.

Although the diffraction grating surfaces 6 and 7 in FIG. 2 are illustrated as formed at the boundaries with air, the invention is not confined thereto. As is apparent from the equation (2), instead of air, an optical material may be used with the result that the diffraction grating surface is formed at the boundary between two different materials.

In addition, in the invention, such a grating form is made that the grating edges 8 of corresponding grating portions (4a, 5a) of the diffraction gratings 4 and 5 are relatively shifted from each other in the direction of the grating pitch (in the direction of arrow A–A').

Such features of the invention produce effects which are described by citing practical examples below. As the laminated multilayer type of diffractive optical element in the invention, a two-layer one as shown in FIG. 2 is considered. For the first layer (the first diffraction grating 4), the material chosen here is an ultraviolet setting resin C001 (nd=1.524, vd=50.8) made by Dai-Nippon Ink Chemical Industry Co. Ltd. For the second layer (the second diffraction grating 5), another ultraviolet setting resin (nd=1.635, vd=23.0) is chosen.

The thickness of the first diffraction grating 4 is assumed to be d1=9.5 μm, the thickness of the second diffraction grating 5 to be d2=6.9 μm, the distance between the two diffraction gratings 4 and 5 to be DL=1.0 μm and the grating pitch to be 30 μm.

At first, the conventional example in which there exists no relative shift of the grating edges has the diffraction efficiency as shown in FIG. 15. In FIG. 15, a solid line curve is obtained when the design parameters have the same values as those cited above. Incidentally, for the purpose of comparison, the diffraction efficiency in this case obtained when the grating pitch only is increased to 140 μm is shown by the dashed line curve.

As is understandable from the comparison of these two curves, a lower diffraction efficiency results from the smaller grating pitch. This lowering is as large as 4 to 5% and, moreover, uniformly over the entire range of wavelengths, being not negligible as the flare light and being, therefore, desired to be improved.

Next, a case where the parameters have the values cited before and, as in the invention, the grating edges are relatively shifted from each other is discussed. Referring to FIG. 2, the first and second diffraction gratings 4 and 5 have m-th grating portions with their grating edges 8 respectively at distances RL(m) and RL+1 (m) measured from a certain reference point. The relative positional shift $\Delta xL(m)$ between the grating edges 8 is expressed by the following equation:

$$\Delta xL(m) = RL(m) - RL+1(m).$$

Figure 3:
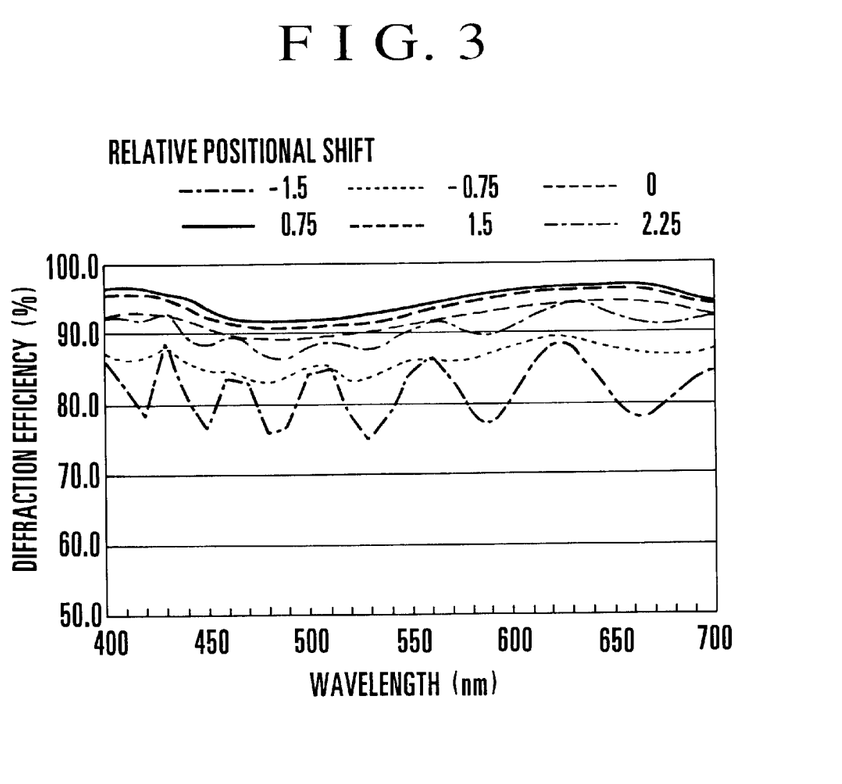
FIG. 3 is a graph for explaining the relationship between the positional shift and the diffraction efficiency for the design order with respect to wavelengths in the diffractive optical element according to the first embodiment.

FIG. 3 is a graph showing the values for the parameter of the diffraction efficiency in the first order as the design order, which are plotted against wavelengths when the relative positional shift $\Delta xL(m)$ is varied from $-1.5$ μm to $2.25$ μm. It will be seen from the graph of FIG. 3 that the diffraction efficiency becomes higher as the relative positional shift $\lambda xL(m)$ is varied in the order of 0.75, 1.5, 0, 2.25, $-0.75$, $-1.5$ μm. From this fact, the diffraction efficiency is found to be 2 to 3% improved throughout the entire range of wavelengths when the grating edges are shifted from each other by a distance of about 0.75 μm, as compared with when the relative positional shift $\Delta xL(m)$ is "0" as in the conventional example.

Figure 4:
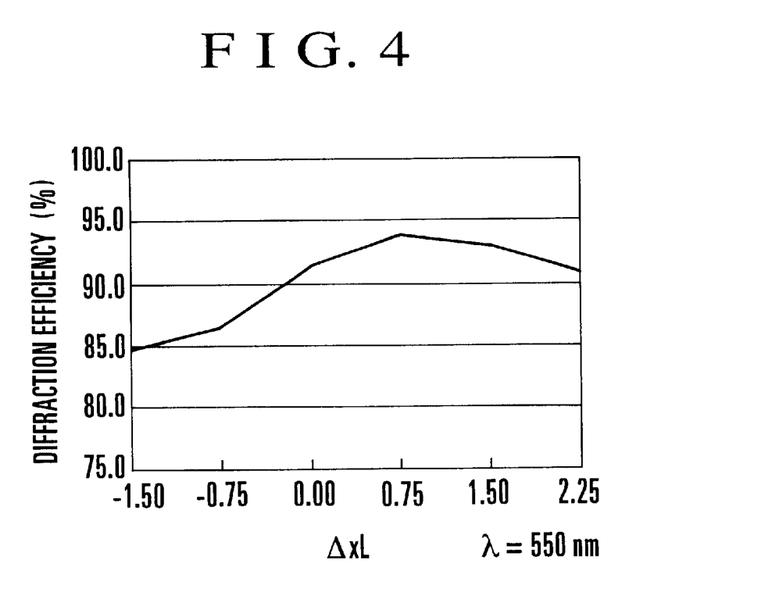
FIG. 4 is a graph for explaining the relationship between the positional shift and the diffraction efficiency for the design order in the diffractive optical element according to the first embodiment.

Also, FIG. 4 shows a variation of the diffraction efficiency at a wavelength of 550 μm by taking the abscissa in the relative positional shift $\Delta xL(m)$. Referring to FIG. 4, more precisely speaking, the diffraction efficiency reaches a peak when the relative positional shift $\Delta xL(m)$ is 1.0 μm or thereabout.

Further, suppose it happens during manufacturing that the grating edges 8 have failed to match the optimum value of the relative positional shift $\Delta xL(m)$, then the diffraction efficiency is caused to change as follows. If the tolerance for positioning is, for example, ±0.5 μm, it results in the conventional example that, because of its having no relative positional shift ($\Delta xL(m)=0$), the deviation from the ideal value is reflected to a position error of ±0.5 μm, which in turn causes the diffraction efficiency to fluctuate by about 5%.

On the other hand, in the first embodiment, the relative positional shift ranges 1.0±0.5 μm, i.e., varies from 0.5 to 1.5 μm, thus making it possible to limit the range of variation of the diffraction efficiency to 1% or less, as can be read from the graph of FIG. 4. Therefore, while, in the conventional example, to keep the high diffraction efficiency, there is need to accurately align the edges of the confronting grating portions, the arrangement of the invention has an additional advantage of comparatively moderating the tolerance for assembling than the conventional example.

It is to be noted that, as the grating pitch decreases, the relative positional shift of the grating edges in the invention is made rather larger, so that the diffraction efficiency is further improved. Also, it is preferred that, as the distance between the L-th diffraction grating and the (L+1)st diffraction grating increases, the relative positional shift of the grating edges is made larger.

In more detail, where n1L and n2L are the refractive indices for an arbitrary wavelength $\lambda$ on the light-entrance side and the light-exit side, respectively, of a material of the L-th diffraction grating, $\theta L$ is an angle an incident ray makes with a normal line of a grating, P is the grating pitch, dL is a grating thickness of the L-th diffraction grating, and DL is a distance between the L-th diffraction grating and the (L+1)st diffraction grating, it is preferred that the relative positional shift $\Delta xL$ of the grating edges which form the grating pitch of the (L+1)st diffraction grating and the grating pitch of the L-th diffraction grating satisfies the following condition:

$$0 < \Delta xL \leq 2((dL/2)+DL)^* \tan \alpha_{L+1}$$

$$\alpha_{L+1} = \sin^{-1}((n1L^*\sin\theta L - (n1L-n2L)d1/P)/n2L).$$

In actual practice, if the relative positional shift $\Delta xL$ is not greater than $2((dL/2)+DL)^*\tan \alpha L_{+1}$, the effect of the invention can be adequately obtained.

In connection with the first embodiment, it is to be noted that, instead of the air layer, the space between the L-th diffraction grating and the (L+1)st diffraction grating may otherwise be filled with a material which is different in refractive index from each of the materials of the L-th diffraction grating and the (L+1)st diffraction grating.

Also, in the first embodiment, the diffractive optical element may be divided into a number of areas, and in diffraction gratings located in part of the plurality of areas, the grating edges may be shifted from each other in the direction of the grating pitch. Further, the relative positional shift of the grating edges may be effected by varying the width of the grating pitch at a particular section of the grating portion.

A second embodiment of the invention is described below. Although the first embodiment has been described in connection with the diffraction grating form having a particular constant grating pitch, the invention is not confined thereto. Really, the invention is applicable even to a type of diffractive optical element in which the grating pitch of the diffraction grating varies gradually. In this case, depending on the magnitude of the grating pitch, it is only required to change the relative positional shift.

Figure 5:
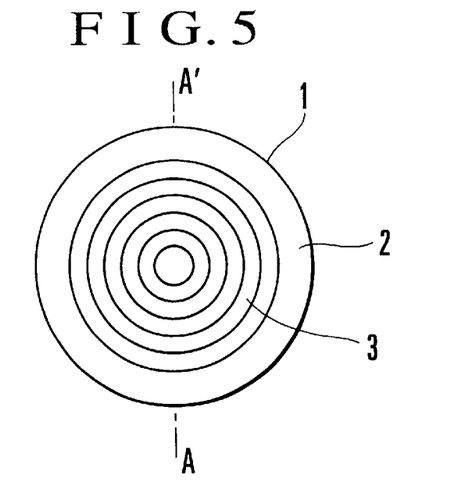
FIG. 5 is a plan view of the main part of a diffractive optical element according to a second embodiment of the invention.
Figure 6:
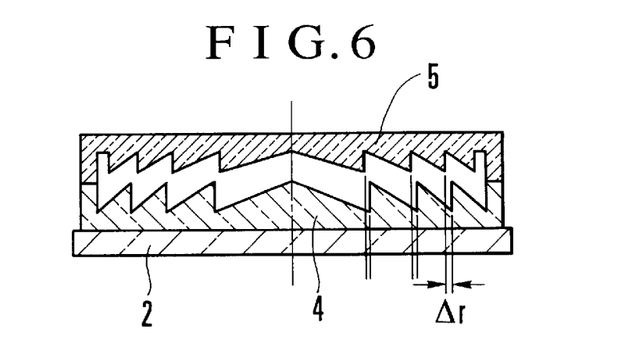
FIG. 6 is a cross-sectional view of the diffractive optical element taken along A–A' line of FIG. 5.

FIG. 5 is a schematic diagram for explaining a diffractive optical lens as an example of gradual variation of the grating pitch. FIG. 6 is a cross-sectional view taken along line A–A' of FIG. 5. In this case, it is general that, as shown in FIG. 6, two diffraction gratings 4 and 5 whose pitches become progressively smaller as advancing from the lens center to the margin are formed on the substrate 2, while the relative positional shift $\Delta r$ becomes progressively larger.

Figure 7:
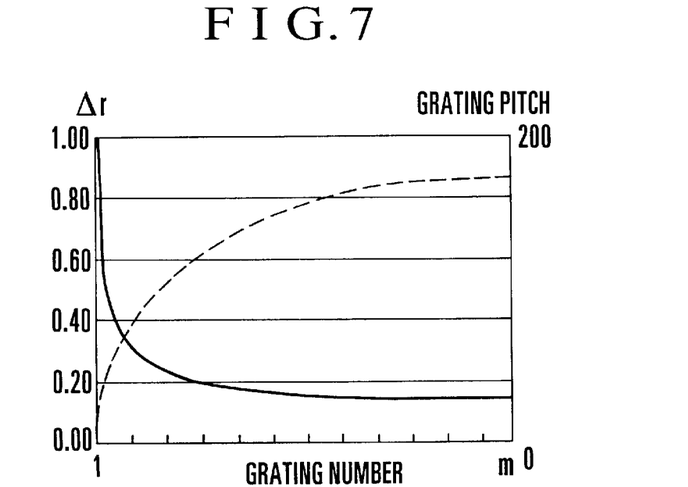
FIG. 7 is a graph for explaining the grating pitch and the positional shift relative to the grating number in the diffractive optical element according to the second embodiment.

FIG. 7 is a graph concerned with the diffractive optical lens having concentric gratings with a center at the optical axis thereof, showing the radial distribution of grating pitches and the relative positional shift Δr taken in the ordinate, and the grating number counted from the center taken in the abscissa. The grating pitch width (shown by a solid line curve in FIG. 7) rapidly decreases from 200 μm in the paraxial zone and then slowly decreases, finally reaching about 30 μm. The relative positional shift Δr in μm (shown by a dashed line curve in FIG. 7) increases from nearly "0" at, or in the neighborhood of, the center, in the paraxial zone, and then slowly increases as going toward the margin.

The second embodiment has been described in connection with the plane plate 2 on which to put the diffraction grating 4. However, the diffraction grating may be provided on a spherical surface like the lens surface. Even if so, similar results can be attained.

Also, although the second embodiment has been illustrated on the assumption that the diffraction order is the first order, the invention is not confined to the light in the first order. Even for the light in the second or other orders, if the combined optical path length difference is determined to be equal to the desired design wavelength in the desired diffraction order, similar results can be attained.

Figure 8:
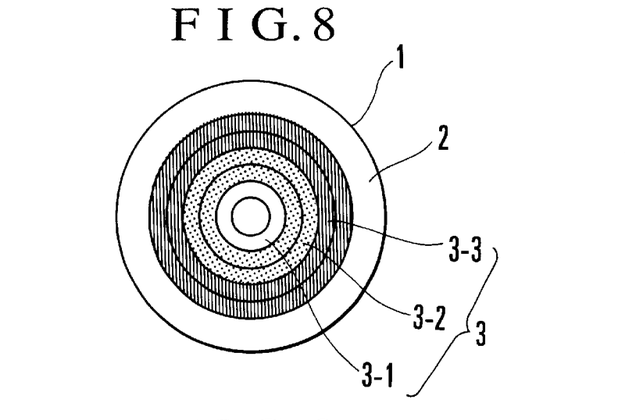
FIG. 8 is a plan view of the main part of a diffractive optical element according to a third embodiment of the invention.
Figure 9:
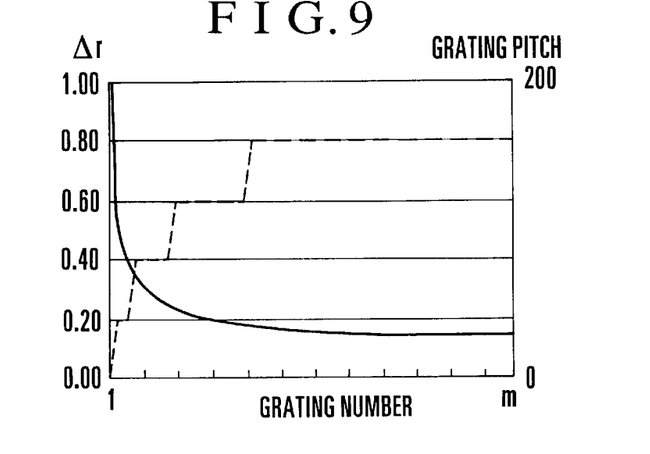
FIG. 9 is a graph for explaining the grating pitch and the positional shift relative to the grating number in the diffractive optical element according to the third embodiment.

A third embodiment of the invention is described below with reference to FIGS. 8 and 9. FIG. 8 is a front elevation view of a diffractive optical element according to the third embodiment. Referring to FIG. 8, a diffraction grating 3 is divided into three areas 3-1, 3-2 and 3—3. The relative positional shift of the grating edges differs with the respective areas 3-1, 3-2 and 3—3, although, within each of the areas 3-1, 3-2 and 3—3, the relative positional shift remains constant. In any one of the areas, the offset is constant. FIG. 9 is a graph similar to FIG. 7, showing the distribution of the grating pitch and the relative positional shift Δr with respect to the grating number. In this case, by changing only the grating pitch width of the grating portion which lies at the boundary between adjoining two of the areas, even if the distribution of the remaining pitches is the same, it becomes possible to obtain the relative positional shift. Accordingly, from the point of view of manufacturing, the arrangement that produces the effects of the invention can be more easily realized.

Figure 10:
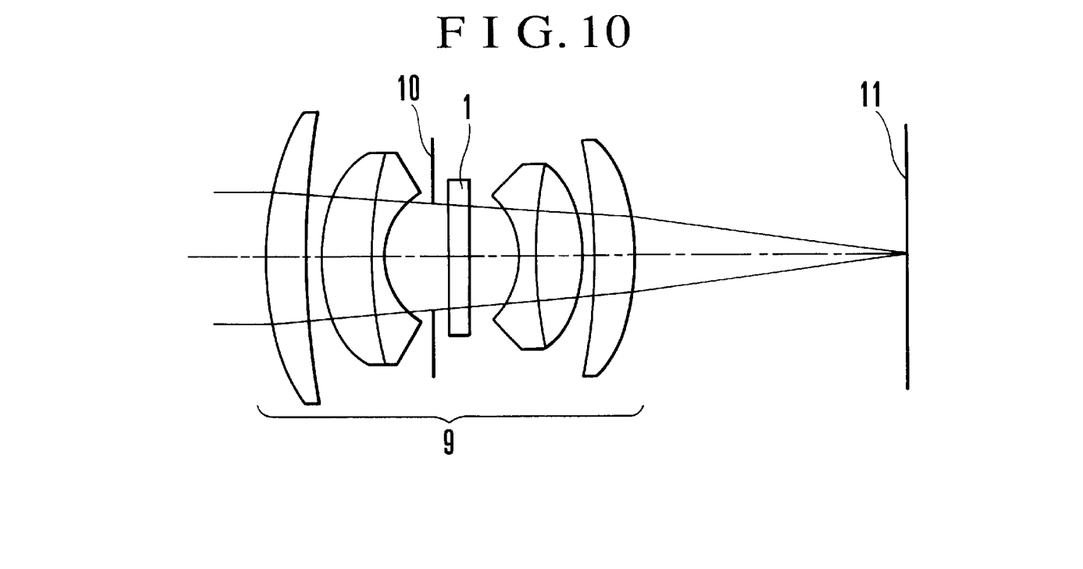
FIG. 10 is a schematic diagram of an optical system using the diffractive optical element according to a fourth embodiment of the invention.

A fourth embodiment of the invention is described as applied to an optical system using the diffractive optical element with reference to FIG. 10. FIG. 10 in longitudinal section view shows a photographic optical system for the camera or the like. Referring to FIG. 10, a photographic lens 9 is provided, in the interior thereof, with a diaphragm 10 and a diffractive optical element 1 formed in a plane-plate shape. Film or a CCD is put on a focal plane 11.

Since the diffractive optical element 1 is constructed with a plurality of diffraction gratings in laminated form, the wavelength-response characteristics of the diffraction efficiency is remarkably improved, so that it is possible to obtain a high-performance photographic lens having less flare and having a high resolving power in the low frequencies. Also, the diffractive optical element of the invention is, as shown in FIG. 6, amenable even to such a simple production technique that the two diffraction gratings are manufactured in separation and then cemented together at their margins. In view of the photographic lens, therefore, the invention can afford a lens which is excellent in mass production and has low cost.

Although the fourth embodiment has been illustrated in FIG. 10 with the diffractive optical element 1 provided on the surface of the plane glass plate adjacent to the diaphragm 10, the invention is not confined thereto. The diffraction grating may otherwise be positioned on the lens surface. Further, a plurality of diffractive optical elements may be used in a single photographic lens.

Also, although the fourth embodiment has been described as applied to the camera for photography, the invention is not confined thereto. It is to be understood that the invention is applicable to the taking lens for the video camera, the image scanner of the office instrument and the reader lens of the digital copying machine. Even in these cases, similar results are attained.

Figure 11:
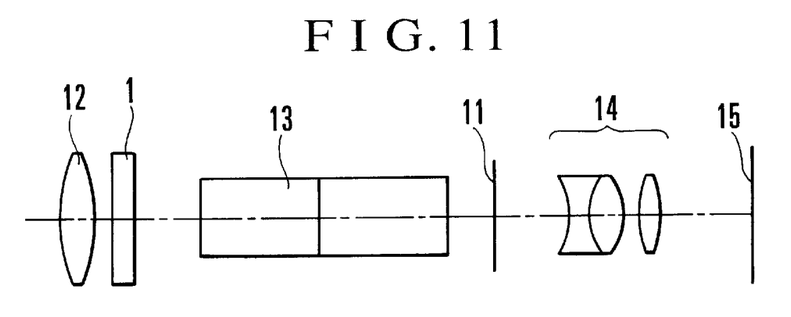
FIG. 11 is a schematic diagram of an optical system using the diffractive optical element according to a fifth embodiment of the invention.

Referring to FIG. 11, a fifth embodiment of the invention is described as applied to the observing optical system such as binoculars. In FIG. 11, an objective lens 12, a diffractive optical element 1, an image erect prism 13 (image inverting means) and an eyepiece 14 are arranged in this order from the object side in front of a viewing plane (pupil) 15. The diffractive optical element 1 of the invention is put behind the objective lens 12 to correct chromatic aberrations at an image plane 11.

The use of the laminated structure in the plurality of diffraction gratings of the diffractive optical element has remarkably improved the wavelength-response characteristics of the diffraction efficiency. It is, therefore, possible to obtain an objective lens which has lesser flare and a high resolving power in the low frequencies for a high performance. Also, the diffractive optical element of the invention is amenable to low unit-cost production techniques. Therefore, the invention can afford an observing optical system which is excellent in mass production and is capable of being manufactured at low cost.

Although the fifth embodiment has been illustrated with the objective lens 12 associated with the diffractive optical element 1, the invention is not confined thereto. The prism surface, or the interior of the eyepiece 14, may be used as a member on which a diffractive optical element is formed. Even in this case, similar results can be attained. If the diffractive optical element takes its place on the object side of the image plane 11, the objective lens 12 produces an effect of reducing chromatic aberrations in itself alone. In the case of the observing system by the naked eye, it is, therefore, desired to use at least one diffractive optical element adjacent to the objective lens 12.

Although the fifth embodiment has been described as applied to the binoculars, the invention is not confined thereto. It is to be understood that the invention can be applied also to terrestrial telescopes and astronomical telescopes. Even in application to the optical finders of the leaf shutter cameras and video cameras, similar results can be attained.

It will be appreciated from the foregoing that the diffractive optical element has such a structure of construction that at least two diffraction gratings made of at least two materials of different dispersion are superimposed one upon another in contacted (nearly contacted) relation and such a grating form that grating edges or grating pitches of corresponding grating portions of the diffraction gratings are relatively shifted from each other in the direction of the grating pitch (in the direction of arrangement of grating portions).

With the grating edges or grating pitches of the corresponding grating portions relatively shifted from each other, there can be obtained a higher diffraction efficiency than that when no shifting is present in the structure of construction of FIG. 1. In application to an optical system, too, flare or like can be advantageously suppressed to a minimum.

Further, in a case where the diffractive optical element has a diffraction grating of such a structure that the grating pitch gradually varies, the relative positional shift is also made to gradually vary according to the grating pitch.

Such an arrangement makes it possible to provide a diffractive optical element which, when applied to diffraction-refraction type lenses and many other optical systems, gives an optimal diffraction efficiency.

Also, the diffractive optical element is constructed in such a manner that the relative positional shift of the grating edges differs with respective different areas of the diffractive optical element. This arrangement permits employment of simpler and easier production techniques with the result of suppressing the lowering of the diffraction efficiency at most. When such a diffractive optical element is used in the optical system, flare can be suppressed to an acceptable level.

The present invention makes it also possible to employ the diffractive optical element in the high-precision photographic lens, thus providing a low-cost photographic lens, while still maintaining high performance.

Also, the diffractive optical element of the invention is used in the observing optical system. A low-cost and high-precision observing optical system is thus made possible to provide.

What is claimed is:

1. A diffractive optical element, comprising two diffraction gratings composed of materials differing in dispersion from each other, and which are laminated with a separation between the gratings, which allows for enhancing diffraction efficiency for a particular design order throughout a predetermined wavelength region, wherein edges of at least part of corresponding grating portions of said two diffraction gratings are shifted from each other in a direction of grating pitch of each diffraction grating, and a grating thickness of one of the gratings in one period thereof increases monotonically along one direction of the grating pitch.

2. A diffractive optical element according to claim 1, wherein said diffractive optical element has a plurality of areas, and edges of corresponding grating portions of laminated diffraction gratings in part of the plurality of areas are shifted from each other.

3. A diffractive optical element according to claim 1, wherein shifting of edges between corresponding grating portions of said two diffraction gratings is realized by changing the width of a grating pitch at particular locations of the grating portions.

4. A diffractive optical element, comprising two diffraction gratings composed of materials differing in dispersion from each other and which are laminated with a separation between the gratings, which allows for enhancing diffraction efficiency for a particular design order throughout a predetermined wavelength region, wherein grating pitches of at least part of corresponding grating portions of said two diffraction gratings are different from each other, and a grating thickness of one of the gratings in one period thereof increases monotonically along one direction of the grating pitch.

5. A diffractive optical element according to claim 4, wherein a grating pitch of each of said two diffraction gratings is gradually varied, and shifting of edges between corresponding grating portions of said two diffraction gratings becomes larger accordingly as the grating pitch of each grating portion becomes smaller.

6. A diffractive optical element according to claim 4, wherein said diffractive optical element has a plurality of areas, and grating pitches of corresponding grating portions of laminated diffraction gratings in part of the plurality of areas are different from each other.

7. A diffractive optical element according to claim 4, wherein a difference between grating pitches of corresponding grating portions of said two diffraction gratings is realized by changing the width of a grating pitch at particular locations of the grating portions.

8. A diffractive optical element according to either of claims 1 and 4, wherein, where n1L and n2L are refractive indices for an arbitrary wavelength λ on a light-entrance side and a light-exit side, respectively, of a material of the L-th diffraction grating, when counted from a substrate, of said two diffraction gratings, θL is an angle of an incident ray makes with a normal line of the L-th diffraction grating, P is a grating pitch, dL is a grating thickness of the L-th diffraction grating, and DL is a distance between the L-th diffraction grating and the (L+1)st diffraction grating, a positional shift ΔxL between edges of corresponding grating portions of the (L+1)st diffraction grating and the L-th diffraction grating satisfies the following condition:

$$0 < \Delta xL \leq 2((dL/2)+DL)^* \tan \alpha_{L+1}$$

$$\alpha_{L+1} = \sin^{-1}((n1L^* \sin\Theta L - (n1L-n2L)d1/P)/n2L).$$

9. A diffractive optical element according to either of claims 1 and 4, wherein the predetermined wavelength region is a visible spectrum.

10. A diffractive optical element according to either of claims 1 and 4, wherein the first diffraction grating, when counted from a substrate, of said two diffraction gratings is made from the same material as that of the substrate.

11. A diffractive optical element according to either of claims 1 and 4, wherein said two diffraction gratings have respective grating portions, edges or pitches of which are shifted or different from each other, with said two diffraction gratings confronting each other across an air layer.

12. A diffractive optical element, comprising two diffraction gratings composed of materials differing in dispersion from each other and which are laminated with a separation between the gratings, wherein, with respect to at least two wavelengths, a maximum optical path length difference is made equal to integer times each of the wavelengths, and wherein edges of at least part of corresponding grating portions of said two diffraction gratings are shifted from each other in a direction of grating pitch of each diffraction grating, and a grating thickness of one of the gratings in one period thereof increases monotonically along one direction of the grating pitch.

13. A diffractive optical element according to claim 12, wherein said diffractive optical element has a plurality of areas, and edges of corresponding grating portions of laminated diffraction gratings in part of the plurality of areas are shifted from each other.

14. A diffractive optical element according to claim 12 wherein the shifting of edges between corresponding grating portions of said two diffraction gratings is realized by changing the width of a grating pitch at particular locations of the grating portions.

15. A diffractive optical element, comprising two diffraction gratings composed of materials differing in dispersion from each other and which are laminated with a separation between the gratings, wherein, with respect to at least two wavelengths, a maximum optical path length difference is made equal to integer times each of the wavelengths, and wherein grating pitches of at least part of corresponding grating portions of said two diffraction gratings are different from each other, and a grating thickness of one of the gratings in one period thereof increases monotonically along one direction of the grating pitch.

16. A diffractive optical element according to claim 15 wherein said diffractive optical element has a plurality of areas, and grating pitches of corresponding grating portions of laminated diffraction gratings in part of the plurality of areas are different from each other.

17. A diffractive optical element according to claim 15, wherein a difference between the grating pitches of corresponding grating portions of said two diffraction gratings is realized by changing the width of a grating pitch at particular locations of the grating portions.

18. A diffractive optical element according to either of claims 12 and 15, wherein, where n1L and n2L are refractive indices for an arbitrary wavelength $\lambda$ on a light-entrance side and light-exit side, respectively, of a material of the L-th diffraction grating, when counted from a substrate, of said two diffraction gratings, $\theta$L is an angle an incident ray makes with a normal line of the L-th diffraction grating, P is a grating pitch, dL is a grating thickness of the L-th diffraction grating, and DL is a distance between the L-th diffraction grating and the (L+1)st diffraction grating, a positional shift $\Delta \times L$ between edges of corresponding grating portions of (L×1)st diffraction grating and the L-th diffraction grating satisfies the following condition:

$$0 < \Delta \times L \leq 2((dL/2)+DL)*\tan \alpha_{L+1}$$

$$\alpha_{L+1} = \sin^{-1}((n1L*\sin\theta L - (n1L-n2L)d1/P)/n2L).$$

19. A diffractive optical element according to either of claims 12 and 15, wherein the two wavelengths are included in a visible spectrum.

20. A diffractive optical element according to either of claims 12 and 15, wherein the first diffraction grating, when counted from a substrate, of said two diffraction gratings is made from the same material as that of the substrate.

21. A diffractive optical element according to either of claims 12 and 15, wherein said two diffraction gratings have respective grating portions, edges or pitches of which are shifted or different from each other, with said two diffraction gratings confronting each other across an air layer.

22. A diffractive optical element according to either of claims 12 and 15, wherein diffraction efficiency in a particular order is made not less than 95% in a wavelength range of 450 nm to 650 nm.

23. An optical system using said diffractive optical element according to one of claims 1, 4, 12 and 15.

24. An optical system according to claim 23, wherein said optical system is an image forming optical system.

25. An optical system according to claim 23, wherein said optical system is an observing optical system.

26. A diffractive optical element according to anyone of claims 1, 4, 12 and 15, wherein, when said two diffraction gratings are circular gratings, the one direction of the grating pitch is a direction from a center of the grating to a margin of the grating.

27. A diffractive optical element, comprising two diffraction gratings composed of materials differing in dispersion from each other, and which are laminated with a separation between the gratings, which allows for enhancing diffraction efficiency for a particular design order throughout a predetermined wavelength region, wherein edges of at least part of corresponding grating portions of said two diffraction gratings are shifted from each other in a direction of a grating pitch of each diffraction grating;

wherein the grating pitch of each of said two diffraction gratings is gradually varied, and the shifting of edges between corresponding grating portions of said two diffraction gratings becomes larger accordingly as the grating pitch of each grating portion becomes smaller.

28. A diffractive optical element, comprising two diffraction gratings composed of materials differing in dispersion from each other and which are laminated with a separation between the gratings, which allows for enhancing diffraction efficiency for a particular design order throughout a predetermined wavelength region, wherein grating pitches of at least part of corresponding grating portions of said two diffraction gratings are different from each other;

wherein a grating pitch of each of said two diffraction gratings is gradually varied, and a difference of the grating pitches between corresponding grating portions of said two diffraction gratings becomes larger accordingly as the grating pitch of each grating portion becomes smaller.

29. A diffractive optical element, comprising two diffraction gratings composed of materials differing in dispersion from each other and which are laminated with a separation between the gratings, wherein, with respect to at least two wavelengths, a maximum optical path length difference is made equal to integer times each of the wavelengths, and wherein edges of at least part of corresponding grating portions of said two diffraction gratings are shifted from each other in a direction of a grating pitch of each diffraction grating;

wherein the grating pitch of each of said two diffraction gratings is gradually varied, and the shifting of edges between corresponding grating portions of said two diffraction gratings becomes larger accordingly as the grating pitch of each grating portion becomes smaller.

30. A diffractive optical element, comprising two diffraction gratings composed of materials differing in dispersion from each other and which are laminated with a separation between the gratings, wherein, with respect to at least two wavelengths, a maximum optical path length difference is made equal to integer times each of the wavelengths, and wherein grating pitches of at least part of corresponding portions of said two diffraction gratings are different from each other;

wherein a grating pitch of each of said two diffraction gratings is gradually varied, and a difference of the grating pitches between corresponding grating portions of said two diffraction gratings becomes larger accordingly as the grating pitch of each grating portion becomes smaller.

31. An optical system using said diffractive optical element according to one of claims 21 to 30.

32. An optical system according to claim 31, wherein said optical system is an image forming optical system.

* * * * *

UNITED STATES PATENT AND TRADEMARK OFFICE
CERTIFICATE OF CORRECTION

PATENT NO.     : 6,587,272 B2
DATED          : July 1, 2003
INVENTOR(S)    : Takehiko Nakai It is certified that error appears in the above-identified patent and that said Letters Patent is hereby corrected as shown below:

<u>Title page,</u>
Item [*] Notice, please insert -- This patent issued on a continued prosecution application filed under 37 CFR 1.53(d), and is subject to the twenty year patent term provisions of 35 U.S.C. 154(a)(2). --

<u>Column 1,</u>
Line 42, "there is" should read -- there is a --.

<u>Column 2,</u>
Line 64, "Although will" should read -- Although this will --;
Line 65, "too much small" should read -- too small --; and
Line 67, "much large" should read -- large --.

<u>Column 5,</u>
Line 64, "consist" should read -- consists --.

<u>Column 7,</u>
Line 32, "functions" should read -- function --.

<u>Column 8,</u>
Line 39, "wavelength, as" should read -- wavelength $\lambda$, as --; and
Lines 63-64, "laminated multilayer type" should read -- laminated-multilayer-type --.

<u>Column 9,</u>
Line 42, "$\lambda$ x L (m)" should read -- $\Delta$ x L (m) --.

<u>Column 10,</u>
Line 3, "there is" should read -- there is a --; and
Line 60, "general" should read -- typical --.

UNITED STATES PATENT AND TRADEMARK OFFICE
CERTIFICATE OF CORRECTION

PATENT NO. : 6,587,272 B2
DATED : July 1, 2003
INVENTOR(S) : Takehiko Nakai It is certified that error appears in the above-identified patent and that said Letters Patent is hereby corrected as shown below:

<u>Column 14,</u>
Line 6, "angle of an" should read -- angle an --;
Line 47, "12" should read -- 12, --; and
Line 63, "15" should read -- 15, --.

Signed and Sealed this

Thirteenth Day of July, 2004

JON W. DUDAS
*Acting Director of the United States Patent and Trademark Office*